United States Patent [19]

Stratiotis

[11] Patent Number: 5,666,010
[45] Date of Patent: Sep. 9, 1997

[54] SAFETY SYSTEM FOR MACHINE TOOLS

[76] Inventor: Gus Stratiotis, 923 Palmito Dr., Millbrae, Calif. 94030

[21] Appl. No.: 520,916

[22] Filed: Aug. 30, 1995

[51] Int. Cl.⁶ .................................................. H02H 11/00
[52] U.S. Cl. ................. 307/328; 307/326; 361/179; 361/180; 361/181; 340/531; 340/532; 340/539; 340/572; 340/573; 409/134
[58] Field of Search .................................. 307/328, 326; 361/179, 180, 181; 250/221; 340/531, 532, 572, 573, 825.23, 539; 409/134

[56] References Cited

U.S. PATENT DOCUMENTS

| | | | |
|---|---|---|---|
| 3,785,230 | 1/1974 | Lokey | 83/58 |
| 3,876,969 | 4/1975 | Price | 340/1 R |
| 3,947,832 | 3/1976 | Rösgen | 340/224 |
| 3,950,755 | 4/1976 | Westbrock, Sr. | 343/225 |
| 3,953,770 | 4/1976 | Hayashi | 317/146 |
| 4,195,722 | 4/1980 | Anderson et al. | 192/131 |
| 4,694,141 | 9/1987 | Hahn | 219/147 |
| 4,794,273 | 12/1988 | McCullough | 307/139 |
| 4,814,632 | 3/1989 | Glaeser et al. | 307/116 |
| 4,937,879 | 7/1990 | Hall et al. | 2/8 |
| 4,965,909 | 10/1990 | McCullough et al. | 17/21 |
| 4,996,742 | 3/1991 | Townsend | 452/125 |
| 5,083,973 | 1/1992 | Townsend | 452/127 |
| 5,148,053 | 9/1992 | Dubois, III | 307/328 |
| 5,189,735 | 3/1993 | Corona | 2/8 |
| 5,198,702 | 3/1993 | McCullough et al. | 307/326 |
| 5,198,800 | 3/1993 | Tozawa et al. | 340/573 |
| 5,353,238 | 10/1994 | Neef et al. | 364/551.01 |
| 5,486,691 | 1/1996 | Dieterle | 250/221 |

FOREIGN PATENT DOCUMENTS

WO90/10140  9/1990  U.S.S.R.  ............ E21C 35/24

*Primary Examiner*—William M. Shoop, Jr.
*Assistant Examiner*—Albert W. Paladini
*Attorney, Agent, or Firm*—Paul F. Schenck Patent Agent

[57] ABSTRACT

A safety device and a supply power controller of a machine tool providing bidirectional communication for determining whether the safety device is appropriate for the particular machine tool, and whether the safety device is properly worn. The communication means used allow to associate one safety device to a plurality of machine tools and a plurality of safety devices to one machine tool, as well as relating safety devices to a specified work zone including a plurality of machine tools.

17 Claims, 5 Drawing Sheets

SAFETY SYSTEM FOR MACHINE TOOLS

FIELD OF THE INVENTION

This invention relates to combinations of safety devices for operators of machine or power tools and safety apparatuses controlling energy supply for machine or power tools. The invention prevents the operator from activating the power tool or machine tool if he did not take necessary steps for protecting himself from potential injuries. The operators's protection devices of the present invention are not limited to any specific group of power tools or machine tools equipped with some kind of a safety apparatus by the manufacturer. The retrofit version of a safety apparatus can be used with any electrical or pneumatic device.

The present invention relates to tools and machine tools in the broadest interpretation and relates to power driven hand drills, saws, cutting tools as well as complex multi-operator controlled machine tools and arrangements of multiple tools operated by one or more operators in a defined work space. Application of the safety system of the present invention is not restricted to tools used in the business of manufacturing or construction but is equally applicable to machinery in agricultural, food processing, and chemical industry.

The present invention allows to prepare a safety device to be used in a circumstance where one Operator uses one machine tool as well as circumstances in which the user of the safety device is a member of a group of operators using the same machine tool in a work space with other machine tools and operators which use safety devices required for the machine tool they operate. The present invention can be used to ensure that within a given work space all operators do wear proper protective safety devices.

BACKGROUND OF THE INVENTION

Much has been done in the area of safety at the workplace. Many rules and regulations have been issued. Quite a number of safety devices have been developed. A number of safety systems have been introduced relating machine operation to operator safety. In the later field the machine/tool and operator are associated via cable connection between machine/tool, a controller and the operator. Such a cable is restricting moveability of the operator, and is cause for costly work stoppage.

The safety system of the present invention overcomes these and other shortcomings by using a wireless connection between a power control apparatus at a machine tool and safety devices worn by operators associated with the machine tool. In a restricted work space area the safety system can be expanded to ensure that safety devices are used and that the wearer of a safety device could cause shutdown of a machine if the particular wearer enters a safety zone of a machine if the worn safety device is not approved for the particular safety zone.

SUMMARY OF THE INVENTION

The protective device of the present invention consists of combinations of two components, the operator worn safety device and the machine tool controlling safety power control apparatus, or short safety apparatus. Both, safety device and safety apparatus are linked by wireless communication, which identifies the safety device and its operative status to the tool controlling safety apparatus. Depending upon the transmitted identification and the status of the safety device, the safety apparatus may or may not allow activation of the tool by the operator. Using a wireless transmission frees the operator from the otherwise needed electrical connection and prevents entanglement of the operator and/or his/her safety device with other object. Such an entanglement may become critical and may cause destruction of the cable connection during an unforeseen accident, thereby increasing the risk to the operator. As wireless communication the device could make use of optical communication, such as infra-red light transmission, acoustical communication, such as ultra-sound acoustic communication, or any one of the many electro-magnetic field communication methods and schemes. In the present invention one or more types of wireless communications may be used concurrently to improve the safety factor.

The present invention may use complex address and identification schemes to use a plurality of independent protective devices within close proximity. The use of these schemes can make it possible to use more than one safety device in combination with one control device, so that in a work condition where more than one person may be exposed to hazardous conditions of one tool anyone of these persons not being properly protected inhibiting operation of the tool. In a similar fashion one safety device may prevent operation of a plurality of tools if the operator in the hazardous zone of these tools is not sufficiently protected.

Means are provided to reduce the possibility of inappropriate use of the wireless communication facility and thereby bypassing the established safety conditions for the operators and workers to be protected.

OBJECTS OF THE INVENTION

It is an object of the present invention to provide for a safety device for tool operators and users a device which ensures that the tool is not operating while the operator or user does not wear the required protection means.

It is an object of the present invention to provide for a protective device for tool operators and users a device which ensures that the tool is not operating while the operators or users do not wear the required protection means.

It is an object of the present invention to provide for a protective device for an operator or user of a plurality of tools a device which ensures that none of the tools can be operated while the operator or user does not wear the required protection means.

It is still another object of the invention to provide for a light weight safety device.

It is still another object of the invention to provide for a safety device which requires no batteries.

It is still another object of the invention to provide for a safety device which includes short term storage means for storing electrical energy recovered from a received electro-magnetic signal.

It is another object of the invention to provide for a safety device which is assignable to a specified safety apparatus of a tool.

It is another object of the invention to provide for a safety device which is assignable to one or more specified safety apparatuses of associated tools.

It is another object of the invention to provide for means allowing to link a specified safety apparatus of a tool to a group of specified safety devices.

It is another object of the invention to provide for means allowing to link a group of specified safety apparatuses of associated tools to a group of specified safety devices.

DETAILED DESCRIPTION OF THE INVENTION

In one embodiment of the invention the electronic section included in the operator/worker worn safety device comprises only passive components and is reactive to signals transmitted from the control device.

In another embodiment of the invention the electronic section included in the operator/worker worn safety device comprises active electronic components but no local power supply means. All electrical energy required is either included in the signal transmitted by the control signal, or a separate signal is used from which the electronic in the safety device can deduce sufficient energy to respond to the information signals transmitted by the control device. In this embodiment a short term storage device for electrical energy is used to overcome temporary energy transmission pauses.

In still another embodiment of the invention the electronic section included in the operator/worker worn safety device comprises active electronic components and local power supply means.

The protective device of the present invention includes two major components:

a workman's safety device, and a safety apparatus attached to or included in a machine tool for enabling or disabling operation of the machine tool.

In a complex safety environment of a work space with several machine tools and other safety zone requirements a workman's safety device of the present invention may include:

means for initiating recognition of the workman's safety device being inside a safety zone;

means for identifying association of the wearer of the workman's safety device to a particular one of the machine tools located in the safety zone;

means for determining safety status of the workman's safety device;

means for associating the workman's safety device to one or more tool machines;

means for transmitting identification and status of the safety device;

In a complex safety environment of a work space with several machine tools and other safety zone requirements the safety apparatus of the present invention attached to each machine tool inside a safety zone and responsive to a workman's safety device of the present invention may include:

means for identifying association of the safety apparatus of a machine tool to the wearer of the workman's safety device located in the safety zone;

means for interrogating workman's safety devices within a predetermined interrogation range;

means for receiving data from one or more workman's safety devices being interrogated;

means for evaluating data received from interrogated workman's safety devices;

means for controlling the associated machine tool in accordance with the evaluated data.

A workman's safety device of the present invention includes safety sensors for determining the safety status of the safety device, such as safety glasses being properly worn, or safety gloves being properly worn. A safety device has as many safety sensors as there are conditions set by the safety requirements. Anyone of the sensors recognizing an unsafe condition generating an unsafe status. The safety status can be interrogated by the safety apparatus of the machine tool and will cause in the safety apparatus of the machine tool an unsafe alert, which might, if appropriate, disable the machine tool. A machine tool not in operation may be disabled to operate. A machine tool being in operation may be shut down in a predetermined shut-down sequence, which may include generation of optical or acoustical alarm signals.

In operating conditions were more than one workman may be associated with a machine tool the safety device includes identification means, and the safety apparatus of the machine tool includes selective interrogation means to determine safety status of each of the safety device associated to the machine tool.

In operating conditions where more than one workman may be associated with a machine tool the safety device, and where several machine tools are located in the same safety zone, the safety device includes identification means and machine tool assignment means, and the safety apparatus of the machine tool includes machine tool identification, and selective interrogation means to determine safety status of each of the safety device associated to the machine tool.

Figure 1A:
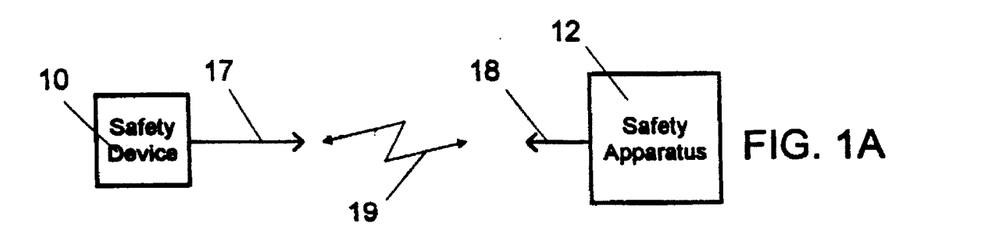
FIG. 1A is an illustration of a single operator/single tool workplace.
Figure 1B:
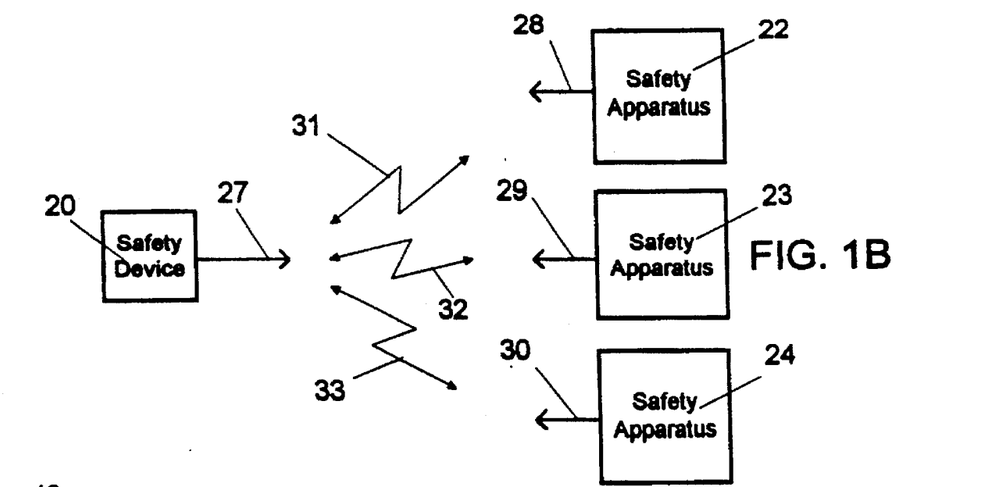
FIG. 1B is an illustration of a multiple operator/single tool workplace.
Figure 1C:
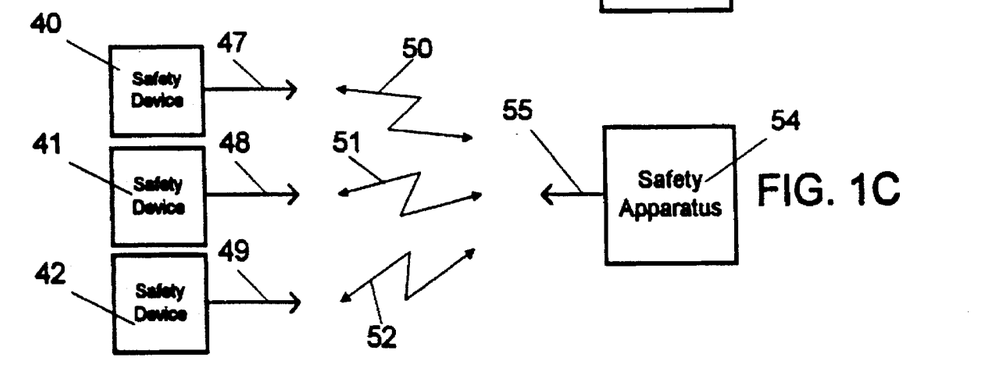
FIG. 1C is an illustration of a single operator/multiple tool workplace.

In the following description the safety device and the safety apparatus are disclosed with the required means for use in a safety zone with multiple machine tools and one or more safety devices assigned to the same machine tool as illustrated in FIGS. 1A–1C.

In FIG. 1A single safety device 10 with an antenna 17 is assigned to a single safety apparatus 12 of a machine tool, not shown. Safety apparatus 12 has a antenna 18 for wireless communication with safety device 10.

In FIG. 1B single safety device 20 with an antenna 27 is assigned to three safety apparatuses 22–24 of one or more machine tools, not shown. Safety apparatuses 22–24 have a antennae 28–30 for wireless communication with safety device 20.

In FIG. 1C three safety devices 40–42 with antennae 47–48 assigned to safety apparatus 54 of a machine tool, not shown. Safety apparatuses 40–42 have antennae 47–49 for wireless communication with safety device 54 having antenna 55.

In FIG. 1A safety apparatus 12 issues an interrogating signal to safety device 10 and gets in return the safety status of the safety device 10 via wireless communication 19.

In FIG. 1B safety apparatuses 22–24 each issues an interrogating signal to safety devices 10 and each one of the safety apparatuses 22–24 gets in return the safety status of safety device 20 via wireless communications 31–33.

In FIG. 1C safety apparatus 54 issues an interrogating signal to each one of the safety devices 40–42 and each one of the safety devices 40–42 issues in return its safety status via wireless communications 50–52.

The feature of wireless communication between one or more safety apparatuses of machine tools, and a plurality of safety devices of workmen is established by a set of identification numbers of safety devices and safety apparatuses, and selectable assignment numbers to relate safety devices to safety apparatuses.

Figure 2:
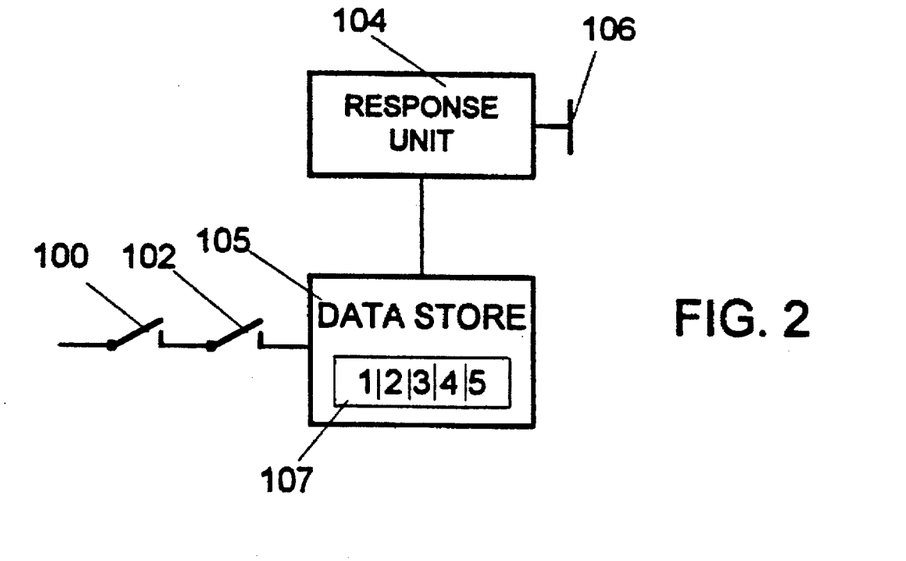
FIG. 2 is a schematic illustration of the safety electronics of the safety device in a single operator/single tool application.
Figure 3:
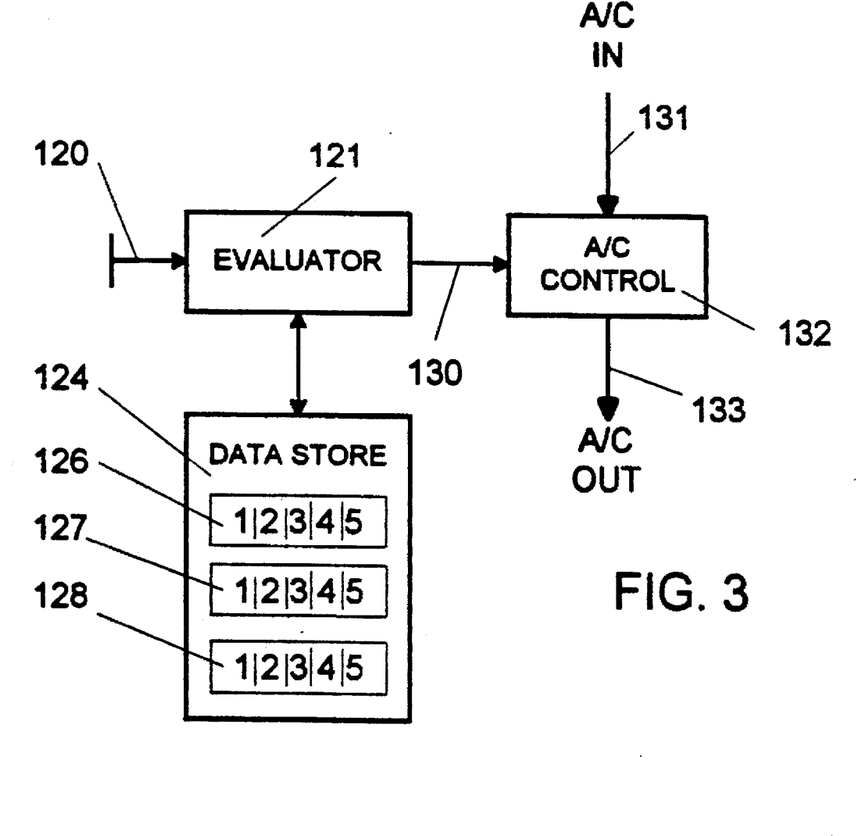
FIG. 3 is a schematic illustration of a very basic safety apparatus of the protective system of the present invention.

FIG. 2 is a schematic illustration of a section of the safety device involved in sensing the safety status and the communication of the safety status to the safety apparatus of a machine tool. The safety status of the safety device is sensed by switches 100 and 102, constituting status sensors, which are opened or closed when handling the safety device by the operator. Depending upon the application an electrical switch, closing or opening an electrical circuit, may be closed when the particular safety feature is observed, e.g. a switch may be closed when a safety device is properly worn by a person. The selection of what type of sensor is used depends on the status to be sensed and the most suitable way of sensing a change in status. Instead of using an electrical switch the safety device may sense a safety status using other sensors such as magnetically operated electrical or electronic switches, magnetically sensitive materials, optically sensitive electronic switches, or other means and combination of means which can sense a particular safety status and provide an electrical signal which can be used to generate an electrical or electronic status signal. Such a status signal is provided to data store 107. Response unit 104 includes an antenna 106 for bi-directional wireless communication with a safety apparatus of a machine tool. During such a bi-directional communication response unit 104 receives a request for status from a safety apparatus of a machine tool. The response would include the actual safety status of the safety sensors and, depending on the configuration of safety device to safety apparatus as shown FIGS. 1A–1C, provide additional data of identification and assignment of safety device and one or more safety apparatuses. Data store 105, electrically connected to response unit 104 can provide such additional data to response unit 104. A unique identification code of the safety device may be prestored or otherwise permanently incorporated in data store 105. An assignment number relating the safety device to a particular machine tool may be entered using entry means 107 such as switches.

The safety apparatus of a machine tool includes an evaluator 121 connected to an antenna 120. The evaluator issues interrogating signals and receives status and other data signals from a safety device. To issue an interrogating signal in a complex configuration of safety devices and safety apparatuses evaluator 121 the unique identification code of the interrogated safety device together with the unique identification code of the safety apparatus. Evaluator 121 receives these codes from data store 124. The unique safety apparatus identification code may be prestored or otherwise permanently incorporated in data store 124. An assignment number relating one or more of the safety devices to the particular machine tool may be entered using entry means 126–128 which may be simple switches.

The result of evaluator 121 is forwarded to A/C control 132, which is interconnected between a power source via A/C IN line 131 and a machine tool via A/C/OUT line 133. Depending upon the type of machine tool connected to the device apparatus A/C control 132 may disallow to use the connected machine tool, may interrupt power to the machine tool, or may power down a machine tool in a predetermined orderly fashion as soon as evaluator 121 detects a safety device assigned to the machine tool being not in a desired safety condition.

Figure 4:
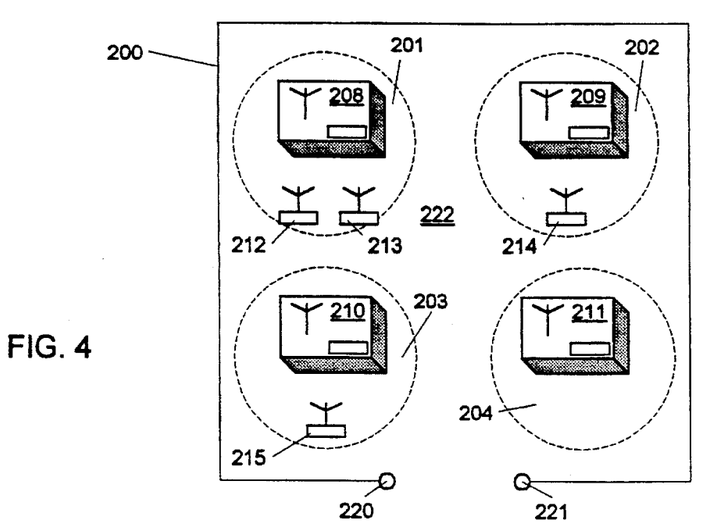
FIG. 4 is a schematic illustration of a work area with four machine tools and different combinations of machine tools and operators.

FIG. 4 is a schematic illustration of a work area 222 with four machine tools having safety apparatuses 208, 209, 210, and 211. Each of the machine tools have an assigned safety zone 201, 202, 203, and 204, respectively. Inside safety zone 201 there are two safety devices 212 and 213. Inside safety zone 202 there is one safety device 214. Inside safety zone 203 is one safety device 215. A safety device being inside a safety zone makes it interrogatable by the evaluator of the particular safety apparatus. Thus, as soon as a safety device is moved into a safety zone, it can be interrogated by the safety apparatus associated to the machine tool associated with the particular safety zone. In FIG. 4 work area 222 is surrounded by a delimiter 200 which could be a fence. At the gate providing access to the work area 222 entry interrogator posts 200 and 221 which can interrogate any safety device passing through for its identification. An interrogator post may be similar to a safety apparatus, except for not being linked to a machine tool. Its task is to identify safety devices being brought in and out of work area 222.

Figure 5A:
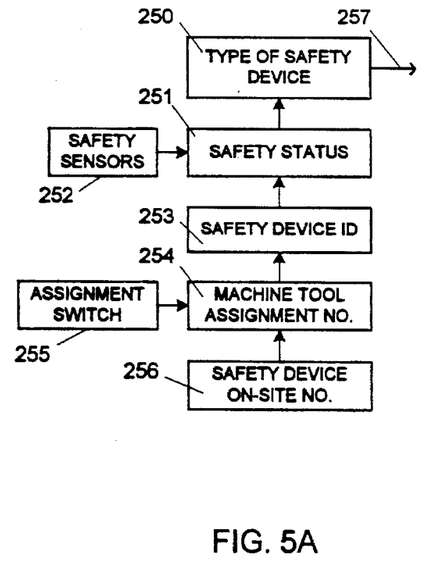
FIG. 5A is an illustration of a safety device interface to the safety apparatus using wireless communication and identification means for the operator's safety device and the safety apparatus of the tool or tools.
Figure 5B:
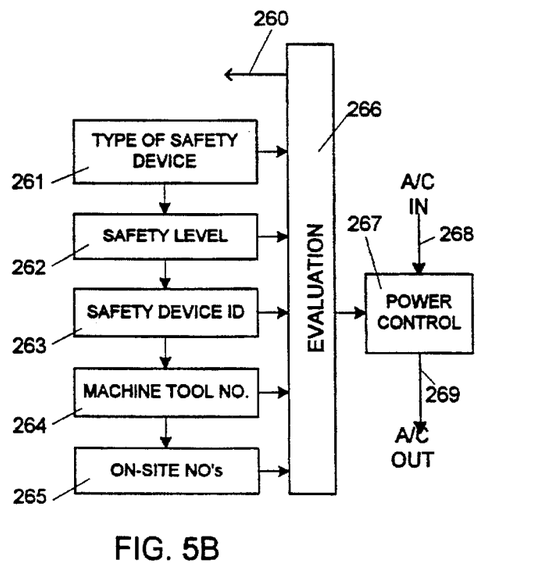
FIG. 5B is an illustration of a safety apparatus interface to the safety device using wireless communication and identification means for the operator's safety device and the safety apparatus of the tool or tools.

FIG. 5A is a schematic illustration of a safety device, FIG. 5B is a schematic illustration of a safety apparatus. Both the FIGS. 5A and 5B relate to the data involved in the data interchange between safety device and a safety apparatus of the present invention.

In FIG. 5A the safety device is represented by data referenced by 250–256 and antenna 257. In FIG. 5B the safety apparatus is represented by data referenced by 261–265, antenna 260, and evaluation process 266 and power control 267.

A safety device provides access to a code identifying the type of safety device 250, the safety status 251 as derived from the signal of the connected safety sensors 252, the unique safety device identification 253, the machine tool number to which the safety device is assigned, as entered at time of assignment at switch 255, and safety device on-site number 256.

A safety apparatus provides access to a code 261 identifying the type of safety device it requires for the associated machine tool, the safety level to be observed 262, the unique machine tool number, and safety apparatus on-site number 256. These data are entered prior to the use of the machine tool in a set-up procedure. After releasing the safety apparatus for proper operation it interrogates for safety devices within the safety zone with a wireless message via antenna 260. The received values are compared in evaluation process 266. The result of the evaluation controls power control 267 and may release or interrupt power supplied on A/C IN 268 to A/C OUT on line 269.

Figure 6:
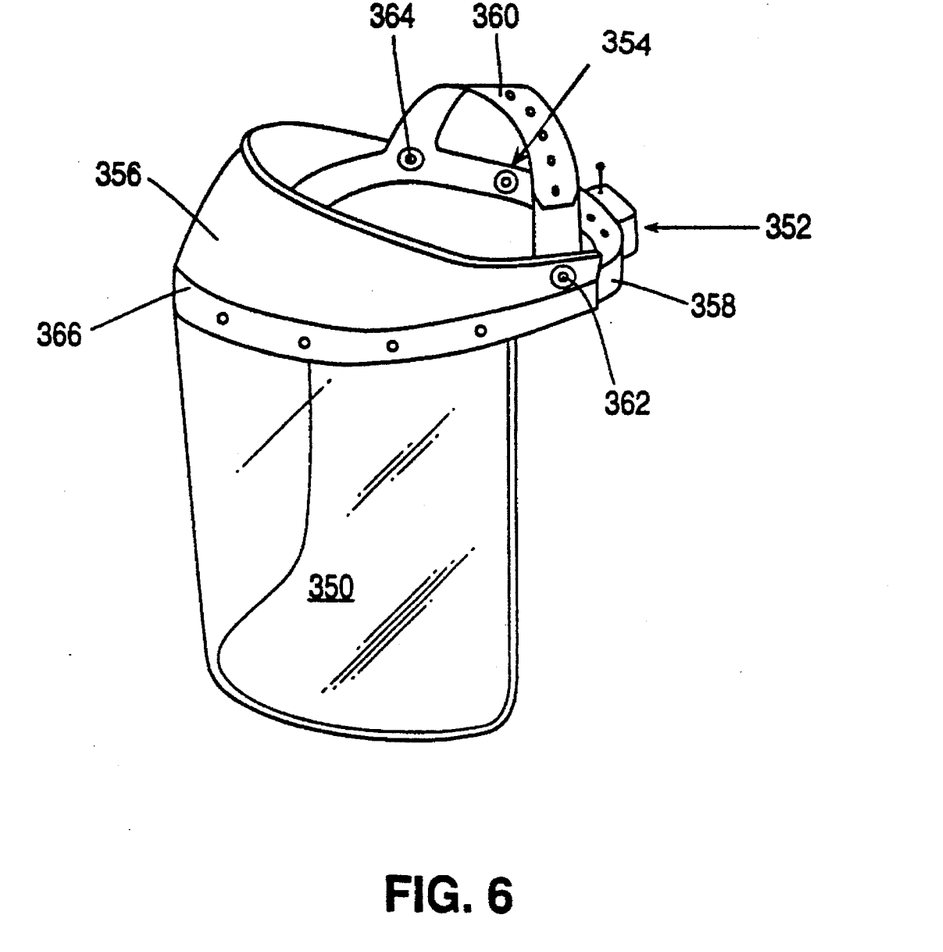
FIG. 6 is a schematic illustration of a safety device used in combination with a face shield.

FIG. 6 is a schematic illustration of a simple safety device of the present invention used in combination with a face shield 350. The shield of FIG. 6 includes transparent face shield 350 which protects the face of the wearer from flying objects and sparks. Face shield 350 is held in shape by the front strap 366. There is a forehead shield 356 above strap 366. Strap 358 encircles the wearers head and may be made from elastic material, or may be adjustable to accommodate different head sizes. Top strap 360 positions the protective shield relative to the top of the head of the wearer. Top strap 360 may be fixed in length or adjustable to accommodate different head sizes. For status generation a sensor switch 354 is mounted in strap 358. Sensor switch 354 is a pressure sensitive switch activated when the head shield is positioned on a head. An electronic device 352 including transmitter, the electronic section of the safety device, an antennae, and selection switches to enter identification and other data, is mounted at the rear side of strap 358. A connection is provided between switch 354 and transmitter 352. Transmitter 352 issues wireless signals including the status signal representing the status of switch 354. There is, of cause no requirement to attach electronic device 352 to strap 358. If electronic device 352 includes the antennae, then it has to be mounted at a location where the antennae can exchange wireless signals with the transmitter of the associated machine tool.

Other sensors needed to report proper or improper use of the head shield may be attached to the head shield as needed and the output signals of such additional sensors may be combined with the signal of switch 354 to form a more complex status signal. In the prototype sensor switches with snap action were used, such as switches of the V3/TB series of MICRO SWITCH™. The sensor switches have a linearly moving sensing pin or an angularly moving sensing arm for determining two sense conditions. However, other switches with different form factors may exhibit advantages when incorporated in the safety device of the present invention. If face shield 352 is rotatably connected by linkage pins 362 and 364 to strap 358, then one of the pins can be combined with an appropriate sensor which then can report whether face shield 352 is in unprotective up-turned position or in protective position in front of the wearer's face. The latter status would support issuance of a proper or safe status signal.

The above disclosed safety system using wireless communication between a machine mounted safety apparatus does not preclude the use of safety devices which require a wired connection to a certain part of the machine tool to determine a safety status condition.

The interrogation for safety devices in the safety zone of a machine tool may sequentially ask for safety device identification numbers 304 (see FIG. 7) as previously recognized at the gate to the work area, or it may use a list of safety devices which may be used on site, or by any other method which can be used to cause a response from a safety device in the safety zone.

Other data may be added as needed to take more safety conditions into consideration without deviating from the spirit of the invention, providing sufficient data to properly relate safety devices to appropriate safety apparatuses within the confines of a work area in order to ensure proper protection for the users of the machine tools.

The Minimum Configuration

The minimum configuration is e.g., a hand drill and the associated operator, who should wear safety glasses. In such a configuration the drill includes a safety apparatus either as component already incorporated with the drill during manufacturing, or the safety apparatus is attached to its power plug. The safety apparatus includes some of the components disclosed above. It does include the A/C power controller and the interrogating and evaluation circuits necessary to interrogate whether the safety glasses are within a certain distance from the evaluation circuit and whether the glasses are worn properly. The safety glasses include the circuitry to recognize an interrogation signal and to respond to it by sending out its identification signal 302 and the status signal 300. Status signal 300 includes safety conditions as required such as: the safety glasses are actually worn, and the safety glasses are in proper condition. Safety device identification 304 can be provided by a signal with a unique device dependent frequency or data (see FIG. 7). Identification data 304 can be set by switches or other mechanical means such as mechanical or electronic fusing means.

Figure 7:
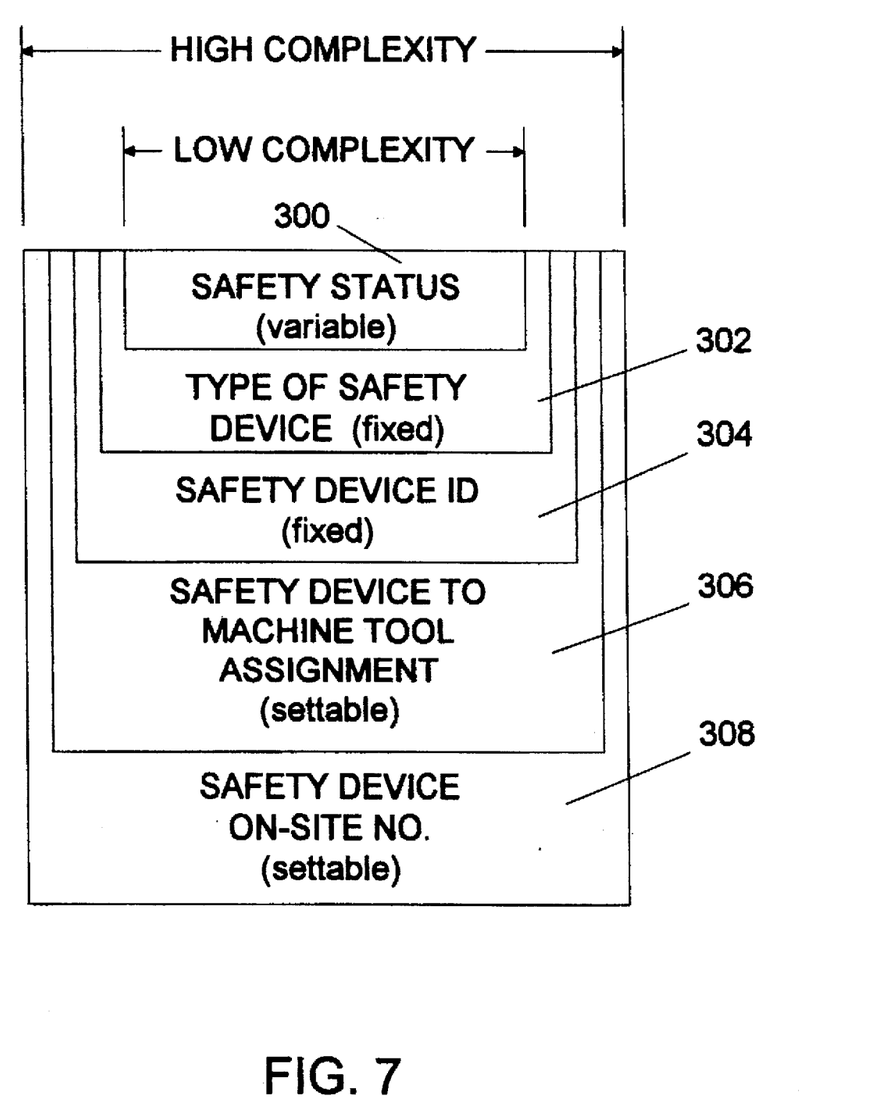
FIG. 7 is an illustration correlating data types with complexity of the safety device/safety apparatus complexity.
Figure 8:
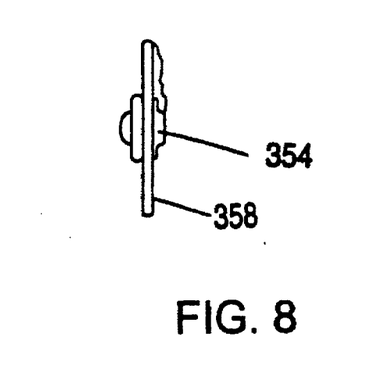
FIG. 8 is a cross section of the sensor switch attached to the strap shown in FIG. 6.

For more complex arrangements identification and other data which are seldom changed, such as type of safety device 302, safety device to machine tool assignment 306, and safety device on-site number 308 can be entered by switches attached to the safety device and electrically connected to electronic device 352. The same data could also be entered via wired or wireless communication and proper keyword protection from a suitable communication terminal. These methods are well known by the knowledgeable artist in the field. FIG. 7 is an illustration interrelating data available from a safety device for different safety device/ safety apparatus complexities. A simple safety device issues only a safety status 300. More complex systems may include all data 300 to 308 or even other additional data as needed or desired without departing from the spirit of the invention.

The safety apparatus, of cause, has to be preset to the expected and valid response. In such a very basic configuration the safety apparatus has to be loaded with the expected and the valid responses and then evaluate the response with the expected response.

In a more complex configuration a machine tool, such as an electrical table saw, the evaluation of the safety apparatus may encounter a plurality of operators and workers with required safety devices. In such an application the safety apparatus is loaded with safety device related data and has to make periodically general interrogations to see what safety devices are within the safety zone of the tool machine. The safety apparatus will use a general interrogation code, which when properly observed by the safety devices will ensure that every safety device will respond and provide its unique identification. The general interrogation code will be issued in intervals to detect whether an unknown safety device is inside the safety zone associated with the table saw of this example of a more complex configuration, or when a certain safety device has been removed from the associated safety zone. In other configurations there may not be defined safety zones, but the reach of the transmitter of the safety apparatus and the characteristics of the receiver of the safety device may establish a zone of close proximity relative to the machine tool in which all safety devices must be properly worn.

In applications where complex machine tool are part of the workspace the safety apparatus of the machine tool may include means for partial or sequential shutdown of the machine tool in case a violation of the set safety regulations relating to the safety devices is detected. A partial shutdown may shut off power to a section of the tool, brake some or all motors, but keep other sufficiently protected sections operative. In a sequential shutdown only most exposed sections of a tool are instantly disabled, while other section are disabled in a sequence as determined by the manufacturer of the tool.

What I claim is:

1. A safety system for a machine tool having an operator, comprising:
   a machine tool having safety apparatus, said safety apparatus including a safety power control device for providing supply power for operating said tool machine;

a protective safety device for said operator;

said protective safety device including detecting means for determining use of said protective device and providing a status either of a safe operating condition or an unsafe operating condition of said protective device, and signalling means sensing said status and generating a status signal;

said power control device including interrupting means for interrupting said supply power, interrogating means for determining said status of said detecting means;

said interrogating means generating an interrogating signal;

said signalling means receiving said interrogating signal and generating said status signal in response to said interrogating signal;

said interrupting means powering down said supply power upon not receiving said status signal indicating a safe operating condition in response to said interrogating signal.

2. A safety system for a machine tool having an operator as claimed in claim 1, wherein said interrupting means inhibits turning power on when said status signal indicates said unsafe operating condition of said protective safety device.

3. A safety system for a machine tool having an operator as claimed in claim 1, wherein said interrupting means allows turning power on when said status signal does indicates safe operating condition of said protective safety device.

4. A safety system for machine tool having an operator as claimed in claim 1, wherein said interrupting means powers down said machine tool when said status signal indicates unsafe operating condition of said protective safety device while said power is turned on.

5. A safety system for a machine tool having an operator as claimed in claim 5, wherein said interrupting means powers down said machine tool by interrupting said supply power when said status signal indicates unsafe operating condition of said protective safety device if said supply power was turned on previously.

6. A safety system for a machine tool having an operator as claimed in claim 5, wherein said interrupting means powers down said machine tool in a predetermined multi-step sequence when said status signal indicated unsafe operating condition of said safety device while said supply power is turned on.

7. A safety system for a machine tool having an operator as claimed in claim 1, wherein said safety device includes identification means supplying a unique identification number to said signalling means for transmission to said safety power control apparatus.

8. A safety system for a machine tool having an operator as claimed in claim 1, said machine tool having a first machine tool assignment number, and wherein said safety device includes assignment means supplying a second machine tool number to said signalling means for transmission to said safety power control apparatus for relating said safety device to said machine tool.

9. A safety system for a machine tool having an operator as claimed in claim 1, wherein said tool machine has a first machine tool assignment number, and wherein said safety device includes assignment means supplying a second machine tool number for to said signalling means for transmission to said safety power control apparatus, thereby relating said safety device to said machine tool and allowing said interrupting means to control said supply power in accordance with said status if said first and said second machine tool assignment number match.

10. A safety system for a machine tool requiring a plurality of safety protective devices for at least one operator of said machine tool, comprising:

a machine tool having a safety apparatus including a safety power control apparatus for controlling supply power for operating said machine tool;

a plurality of protective safety devices for said at least one operator;

each of said protective safety devices including detecting means for determining use of said protective safety device and providing a status of either a safe operating condition or an unsafe operating condition of the associated protective safety device, and signalling means sensing said status and generating a status signal for the associated one of said plurality of safety devices;

said power control device including interrupting means for interrupting said supply power, interrogating means for determining said status of said detecting means of each of said plurality of protective safety devices;

said interrogating means generating an interrogating signals for each one of said plurality of protective safety devices;

said signalling means receiving said interrogating signals and generating said status signal in response to said interrogating signals;

said interrupting means powering down said supply power upon not receiving said status signals indicating a safe operating condition from all of said plurality of protective safety devices in response to said interrogating signals.

11. A safety system for a machine tool wherein said machine tool requires a plurality of said protective safety devices for said operator and wherein said interrogating means determines status of each of said plurality of protective safety devices.

12. A safety system for a machine tool wherein a plurality of operators are associated with said machine tool, wherein each of said operators are required to wear at least one protective safety devices, wherein each of said protective safety devices is interrogated separately and wherein said interrogating means determines status of each of said detecting means associated with said protective devices of said plurality of operators.

13. A protective device for an operator in a safety restricted work zone, said protective device including means for receiving a safety status inquiry signal, means for transmitting a safety status signal in response to said safety status inquiry signal, means for generating said safety status indicating safe/unsafe operating condition of said safety device.

14. A protective device for an operator in a safety restricted work zone, as claimed in claim 1, wherein said safety device includes means for identification, said means for identification including first identification data activating said means for transmitting if said means for receiving detects matching second identification data in said safety status inquiry signal.

15. A protective device for an operator in a safety restricted work zone, as claimed in claim 14, wherein said first identification data include an machine tool identification for assigning said safety device to one of a plurality of machine tools.

16. A protective device for an operator in a safety restricted work zone, as claimed in claim 14, wherein said first identification data include a work zone identification for assigning said safety device to a group of machine tools in a work zone.

17. A safety system for a machine tool having at least one operator as claimed in claim 1, wherein said interrogating means issue a general inquiry signal for determining an unsafe status of said detecting means located in close proximity to said machine tool, and wherein said protective safety device includes means for issuing an unsafe signal in response to said general inquiry signal from said interrogating means.

* * * * *